United States Patent
Herter et al.

(10) Patent No.: US 9,306,922 B2
(45) Date of Patent: Apr. 5, 2016

(54) SYSTEM AND METHOD FOR COMMON ON-BEHALF AUTHORIZATION PROTOCOL INFRASTRUCTURE

(71) Applicant: SAP AG, Walldorf (DE)

(72) Inventors: Klaus Herter, Leimen (DE); Stephan Ilg, Oestringen (DE); Simon Dieterich, Mannheim (DE); Johannes Woda, Walldorf (DE)

(73) Assignee: SAP SE, Walldorf (DE)

( * ) Notice: Subject to any disclaimer, the term of this patent is extended or adjusted under 35 U.S.C. 154(b) by 420 days.

(21) Appl. No.: 13/797,019

(22) Filed: Mar. 12, 2013

(65) Prior Publication Data

US 2014/0282880 A1      Sep. 18, 2014

(51) Int. Cl.
*G06F 7/04* (2006.01)
*H04L 29/06* (2006.01)

(52) U.S. Cl.
CPC .............. *H04L 63/08* (2013.01); *H04L 63/205* (2013.01)

(58) Field of Classification Search
CPC ................................ H04L 63/08; H04L 63/10
USPC ........................................................ 726/2–4
See application file for complete search history.

(56) References Cited

U.S. PATENT DOCUMENTS

| 2010/0138905 A1* | 6/2010 | Kass ................................. 726/7 |
| 2010/0251352 A1* | 9/2010 | Zarchy et al. .................... 726/9 |
| 2011/0314533 A1* | 12/2011 | Austin et al. ..................... 726/9 |

* cited by examiner

*Primary Examiner* — Anthony Brown
(74) *Attorney, Agent, or Firm* — Fountainhead Law Group P.C.

(57) ABSTRACT

A centralized authorization client, in a secure system, that references service provider specific on-behalf authorization protocol implementation records for generating access request messages for accessing user resources hosted by multiple service providers, is disclosed. The service provider-specific authorization implementation records include parameters for requesting user resources associated with a requesting user provided by a specific service provider. Applications running in the secure system can send access request messages through the authorization client to obtain authorization or access to user resources in multiple external service providers so the resources can be displayed, or otherwise manipulated, from application within the secure system. Once authorization is obtained for accessing the resources, the authorization client can store authorization tokens for use in persistent authorized access to multiple external service providers for resources owned by particular users.

20 Claims, 8 Drawing Sheets

SYSTEM AND METHOD FOR COMMON ON-BEHALF AUTHORIZATION PROTOCOL INFRASTRUCTURE

BACKGROUND

The present disclosure relates to computing systems for comprehensive information handling, and in particular, to systems and methods for a common on-behalf authorization protocol infrastructure that can be used to authorize access to resources associated with individual users hosted or stored in external service providers.

Unless otherwise indicated herein, the approaches described in this section are not prior art to the claims in this application and are not admitted to be prior art by inclusion in this section.

Various systems provide integrated data access and analysis solutions for various purposes, such as running businesses and social networking. Typical systems use server applications executed on one or more servers that gather and distribute information over secure networks. Many of these systems provide users access to server data and services through the use of corresponding client applications executed on local client computers. While client-server application configurations are very useful for displaying data directly available to the server applications, it is often desirable to integrate and display information from service providers that are external to the network in which the server applications operate.

For example, various customizable enterprise resource planning systems, such as Business ByDesign™ from SAP®, include server applications for viewing, analyzing, and tracking data regarding various aspects of a particular business stored within a particular secure network. However, a user may also wish to view data, documents, files, and other resources stored or managed by an external service provider, such as Google Documents™ from Google®. To access and display data from external service providers, some server applications use variants of available authorization protocols that can obtain authorization to access resources from the external service providers "on-behalf" of particular users. So called "on-behalf" authorization protocols provide an interface through which separate systems or networks can securely and reliably share resources owned or otherwise associated with individual users. Open Authorization (OAuth) is an example of an on-behalf authorization protocol.

However, because service providers have differing security and privacy concerns, the specific variant of the on-behalf authorization protocol used by a service provider is often unique to that service provider. Accordingly, to gain access to user resources from multiple external service providers, a server application would need to execute the authorization protocol specific to each external service provider.

Such service provider specific authorization protocols have some utility when integrating resources from a limited number of external service providers into a limited number of applications of a particular system. However, existing on-behalf authorization protocol interfaces have significant drawbacks and limitations in systems with many developers creating many applications that incorporate resources from multiple external service providers for many users. One particular drawback is that typical on-behalf authorization protocols do not scale very easily or efficiently.

The specificity of each service provider's authorization protocol requires developers creating server applications to be familiar with the multiple authorization protocols and be able to code multiple compatible authorization routines. Since not all developers are familiar with all the authorization protocol variants, creating an authorization procedure for each service provider can be arduous and inefficient. In addition, executing and maintaining each of the service provider specific authorization protocols, when scaled to the degree required to service the many users and server applications of a particular system, can be an inefficient use of development and computing resources. Various embodiments of the present disclosure address these and other issues.

SUMMARY

Embodiments of the present disclosure improve systems and methods for on-behalf authorization protocol infrastructure implementations using a central authorization client.

One embodiment of the present disclosure includes a method that includes, providing a central authorization client. The central authorization client can include or access multiple authorization implementation records. Each authorization implementation record corresponds to a particular implementation of an authorization protocol associated with one or more external service providers. Such methods also include receiving a data request message for data associated with a user and a particular external service provider from one or more applications. The data associated with the user and the external service provider can be hosted on a remote computer system operated by the external service provider. The method can also include retrieving an authorization token associated with the external service provider and the user from a secure data store using the authorization client, referencing a particular authorization implementation record in the plurality of authorization implementation records associated with the particular external service provider to create a formatted data request based on the data request message, and sending the formatted data request to the external service provider through the authorization client. In some embodiments, the formatted data request includes the authorization token.

In one embodiment, the formatted data request can include an encrypted version of the authorization token according to the particular authorization implementation record.

In one embodiment, the authorization token is accessible only through the authorization client.

In one embodiment, the method can further include receiving, in response to the formatted data request, the data associated with the user and the external service provider.

In one embodiment, the method can further include providing the data associated with the user and the external service provider to the one or more applications, wherein the one or more applications display the data associated with the user and the external service provider in an application specific user interface.

In one embodiment, the authorization implementation record can include parameters for decoding the data associated with the user and the external service provider from a first format to a second format.

In one embodiment, the authorization implementation record can include an open standard authorization protocol.

Other embodiments include non-transitory computer-readable storage media containing instructions that, when executed, control a computer processor to be configured for: providing an authorization client including a plurality of authorization implementation records, wherein each of the plurality of authorization implementation records corresponds to a particular implementation of an authorization protocol associated with at least one of a plurality of external service providers, receiving a data request message, from one or more applications coupled to the authorization client, for data associated with a user and a first external service provider in the plurality of external services providers, wherein the data associated with the user and the first external service provider is hosted on a remote computer system operated by the first external service provider, retrieving an authorization token associated with the first external service provider and the user from a secure data store using the authorization client, referencing a first authorization implementation record in the plurality of authorization implementation records associated with the first external service provider to create a formatted data request based on the data request message, wherein the formatted data request comprises the authorization token, and sending the formatted data request to the external service provider through the authorization client.

Other embodiments include systems that have one or more computer processors and a non-transitory computer-readable storage medium. In such embodiments, the non-transitory computer-readable storage medium can include instructions, that when executed, control the one or more computer processors to be configured for: providing an authorization client comprising a plurality of authorization implementation records, wherein each of the plurality of authorization implementation records corresponds to a particular implementation of an authorization protocol associated with at least one of a plurality of external service providers, receiving a data request message, from one or more applications coupled to the authorization client, for data associated with a user and a first external service provider in the plurality of external services providers, wherein the data associated with the user and the first external service provider is hosted on a remote computer system operated by the first external service provider, retrieving an authorization token associated with the first external service provider and the user from a secure data store using the authorization client, referencing a first authorization implementation record in the plurality of authorization implementation records associated with the first external service provider to create a formatted data request based on the data request message, wherein the formatted data request comprises the authorization token, and sending the formatted data request to the external service provider through the authorization client.

The following detailed description and accompanying drawings provide a better understanding of the nature and advantages of the present disclosure.

DETAILED DESCRIPTION

Described herein are techniques for systems and methods for a centralized on-behalf authorization protocol infrastructure implemented using an authorization client common to all applications and external service providers. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Embodiments of the present disclosure include systems and methods for implementing an on-behalf authorization protocol infrastructure (OBAPI). The OBAPI can be implemented in a secure system, such as an enterprise resource planning (ERP) system, for authorizing access to and integration of resources from multiple external service providers into one or more server applications. In some embodiments, the OBAPI can include a centralized authorization client. The authorization client can implement multiple authorization protocols for and communicate with multiple external service providers as an intermediary for the server applications. The authorization client can store authorization parameters corresponding to specific variants of the authorization protocols used by multiple external service providers. Using the authorization parameters, the authorization client can execute authentication and communication procedures with each of the external service providers to access user resources.

The authorization client advantageously allow developers of server applications to access and integrate resources from multiple external service providers without needing to know the specifics of the particular variants of the authorization protocols implemented by the external services providers. Developers need only obtain the authorization parameters and provide the authorization parameters to the authorization client to quickly and efficiently establish authorized access to user resources. Accordingly, development of server applications for secure systems can be expedited and computing resources can be conserved relative to conventional systems that require each server application to include or handle multiple individual authorization protocols for accessing resources from multiple external service providers.

Figure 1:
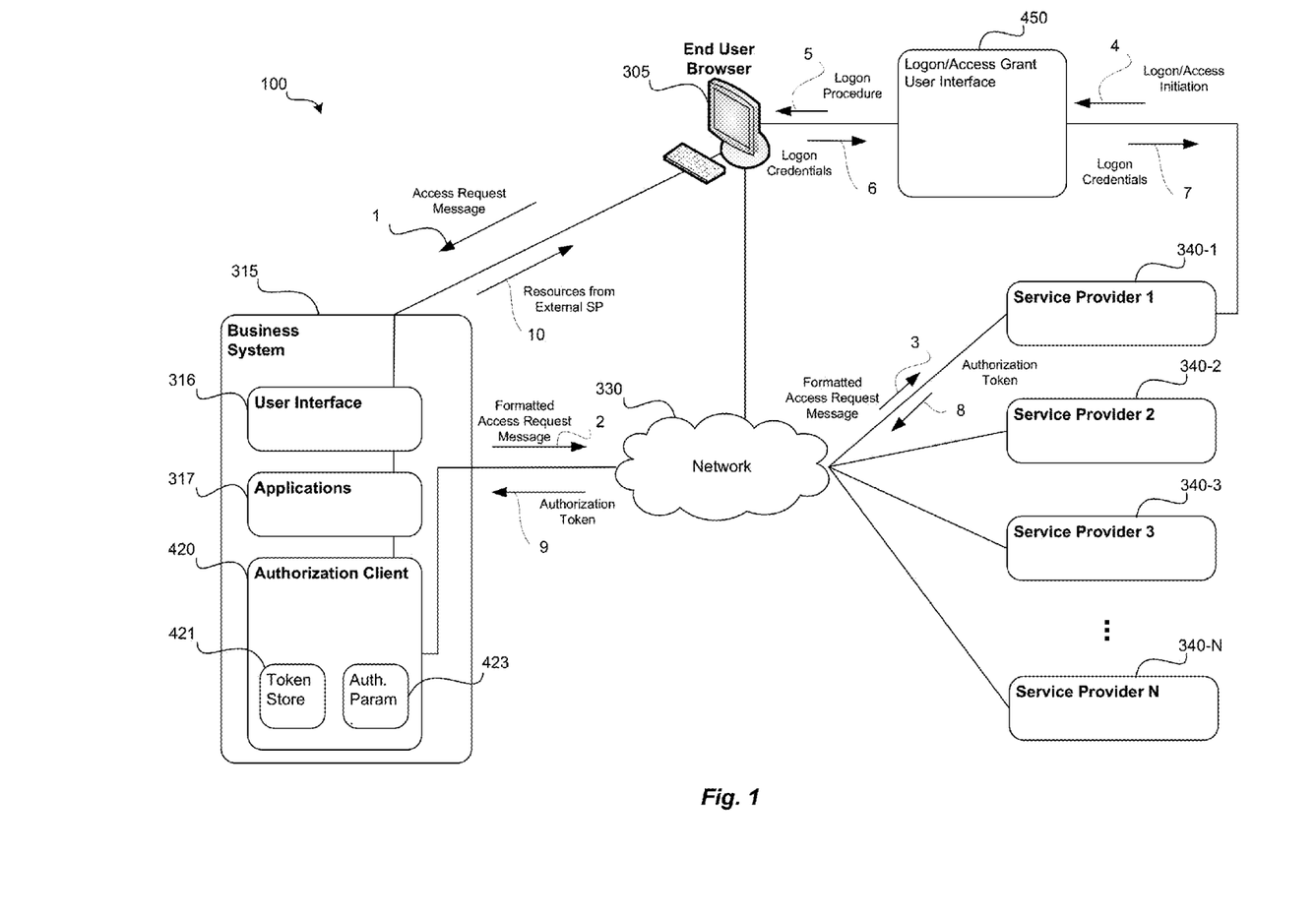
FIG. 1 illustrates a system and data flow for authorizing access to resources from external service providers from within a secure system, according to various embodiments of the present disclosure.

FIG. 1 illustrates a system and an example data flow 100 according to various embodiments of the present disclosure. System 100 can include a business system 315 in communication with multiple service providers 340 through a network 330. Business system 315 can include multiple networked server computers communicating with one another over secure or dedicated electronic communication media using various electronic communication protocols and standards. Business system 315 can include multiple applications 317 executed on one or more of the server computers. For example in an ERP system, applications 317 can include various types of accounting, inventory, sales, and logistics applications. Applications 317 can send and receive data through user interface 316 of business system 315. In one example embodiment, the end-user browser 305 can display the user interface 316 of the business system 315 to a user on a remote client computer.

Using controls provided by user interface 316, the user can operate or interact with one or more applications 317. As shown, a user using the end user browser 305, sends an access request message 1 to business system 315 by operating one or more controls of the user interface 316. The access request message 1 includes a request for one or more of the applications 317 to retrieve user resources from one of the external service providers 340. For example, a salesperson might request a sales application access, retrieve, and display social media broadcasts, such as Twitter® postings, about their customers in user interface 316 alongside or incorporated into information from the sales application.

In response to the access request message 1, Applications 317 invokes authorization client 420 with an internal access request message. The authorization client 420 can be exposed to each of the applications 317 as an authorization application programming interface (API). Accordingly, the internal access request message may be compiled according to the requirements of the authorization API. The internal access request message can includes an external service provider identifier, e.g., a service provider name or identification number, indicating the target external service provider from which the user would like to retrieve user resources. In one example, the internal access request message may also include a user identifier specific to the requesting user. In response to the internal access request message, the authorization client can initiate an authorization procedure according to the specific authorization protocol implemented by the target external service provider.

Once the authorization procedure is initiated, the authorization client 420 may load authorization parameters associated with the target external service provider from the authorization parameters data store (Auth. Param) 423. The authorization parameters in the authorization parameters data store 423 can be stored in authorization implementation records and associated with one or more external service provider identifiers. Accordingly, when loading the authorization parameters, the parameters can then be retrieved based on the target external service provider identifier.

Using the authorization parameters, the authorization client 420 can generate a formatted access request message 2 and send it via network 330 to the target service provider. In the particular example shown in FIG. 1, the target service provider is service provider 1 shown at 340-1. The format and structure of the access request message 2 can be specific to the target external service provider according to the retrieved authorization parameters.

Network 330, which can include various combinations of electronic communication networks, e.g., the Internet, can route the formatted access request message 3 to be delivered to service provider 340-1. In response, service provider 1 at 340-1 can generate a logon/access initiation session 4 viewable to the user as logon/access grant user interface 450 on the end-user browser 305 or in a separate web browser. The logon/access grant user interface 450 can display a prompt for the user to complete a particular logon procedure 5. The logon procedure can include one or more user authentication procedures. For example, the user can enter logon credentials 6, into the logon/access grant user interface 450. The logon credentials can include combinations of usernames, passwords, personal identification numbers, encryption keys, etc. The logon/access grant user interface 450 can then forward the logon credentials 7 in an encrypted or unencrypted format back to service provider 340-1.

Once the service provider 340-1 confirms that the received logon credentials are authentic, service provider 340-1 can send an authorization token 8 through network 330 to the authorization client 420. The authorization client 420 stores the received authorization token in the secure token data store 421. Tokens may be associated with the corresponding service provider and the authorized user. Accordingly, each token is unique and can only be used to access user resources for a particular user from a particular service provider 340.

In one example embodiments, the secured token data store 421 can manage the storage of and updating of authorization tokens. For example, some variants of on-behalf authorization protocols include authorization tokens that expire after a predetermined number of uses or after a predetermined amount of time. For example, the authorization token can be set to expire after one day, or after ten resource transactions. In such embodiments, the authorization tokens can include a refresh token or code which the authorization client 420, or the secured token data store 421, can send to the corresponding service provider 340 to receive an updated authorization token. In this way, access to the user's resources from the particular service providers 340 can be persistent, while also limiting the chance that the token will be intercepted and used for unauthorized access to the user's resources.

With the appropriate authorization tokens stored in the secured token data store 421, applications 317 can readily call on authorization client 420 to access user resources associated with or owned by the corresponding users from one or more of the external service providers 340. Accordingly, the authorization client 420 can use the appropriate authorization token to access and display resources owned by a particular user from a particular service provider 340 on user interface 316 displayed on the end-user browser 305, e.g., from within the secure network environment of business system 315. The use of the authorization tokens eliminates the need to expose sensitive user logon credentials to network 330 each time resources associated with the user are requested from one or more external service providers 340, thus decreasing the possibility that the user's resources in the external service providers 340 will be intercepted or otherwise compromised.

Figure 2:
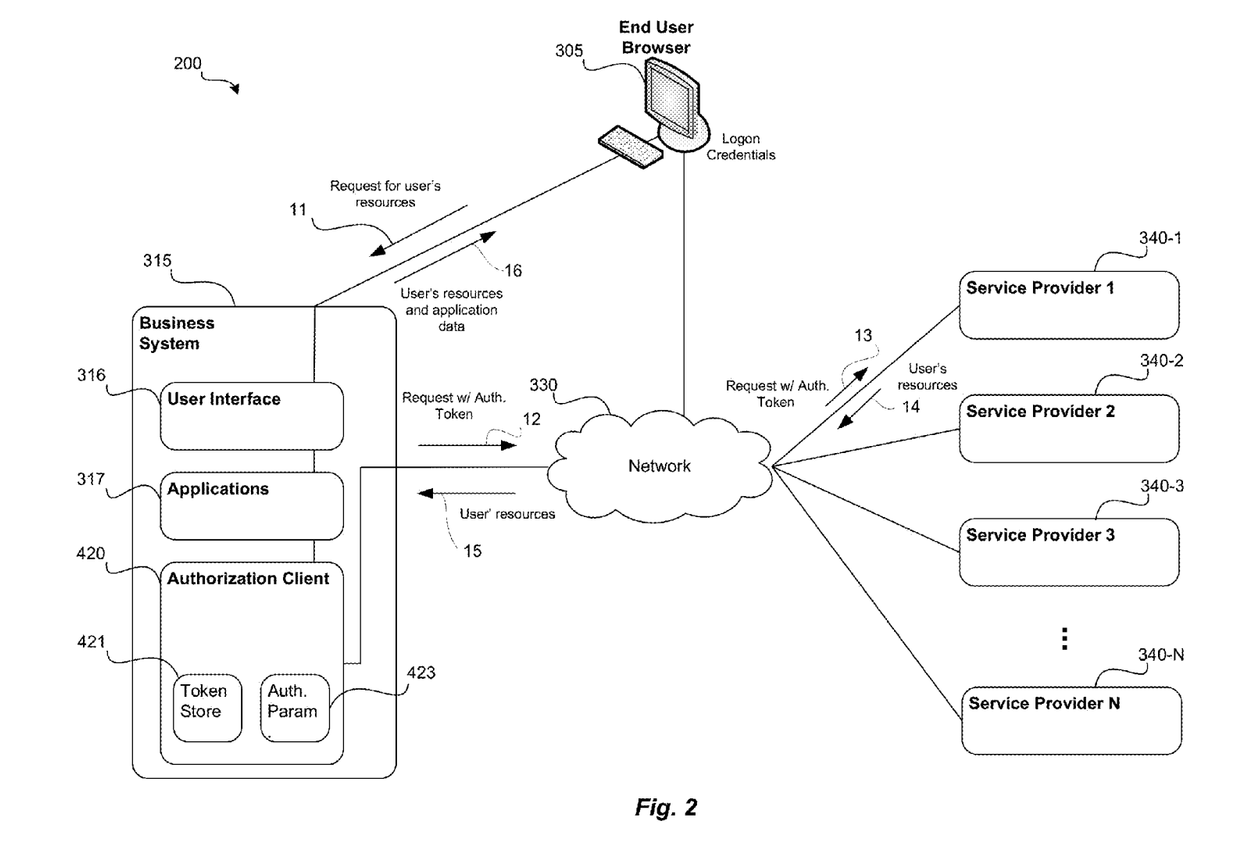
FIG. 2 illustrates a system and data flow for accessing resources from external service providers from within a secure system, according to various embodiments of the present disclosure.

FIG. 2 illustrates a system and a data flow 200 to access resources associated with a particular user from a particular external service providers 340 by one or more applications 317 during an authorized and/or secured communication session with the business system 315. Such embodiments can reference and use previously stored authorization tokens to prove that one of applications 317 or business system 315 are duly authorized to access the user's resources. The previously stored authorization tokens can be the result of a previously completed authorization procedure, such as the procedure described above in reference to the data flow illustrated in FIG. 1.

In one embodiment, a user can send a request for the user's resources 11 using user interface 316 displayed on an end-user browser 305 on a local client computing system. The request for user's resources 11 can include the user's user identifier and the service provider identifier. In some embodiments, the request for the user's resources 11 can be initiated using controls provided by an application 317 displayed in the user interface 316. For example, application 317 can display a tab or an active button, that when operated, sends the request for the user's resources 11 to the business system 315 or application 317.

In response to the request for the user's resources 11, one or more of the applications 317 can send an internal access request message to the authorization client 420 to access and/or retrieve the user's resources from the external service provider 340 specified by the service provider identifiers. The authorization client 420 can retrieve one or more previously stored authorization tokens from the secure token data store 421 based on the user identifier and service provider identifiers. The authorization client 420 can also retrieve authorization parameters from the authorization parameter data store 423 based on the service provider identifier.

Referencing the authorization parameters specific to the external service provider 340, the authorization client 420 can generate an request 12 that includes the authorization token. Network 330 can forward the request with authorization token 13 to the specific external service provider 340. In this particular example, service provider 340-1, such as Google Docs™, is the selected external service provider. Service provider 340-1 can verify the authenticity or check the expiration of the authorization token. If the authorization token included in the request 13 is still valid and deemed to be authentic, then service provider 340-1 can send the requested user's resources 14 through network 330, which can route the user's resources 15 to the authorization client 420. In some embodiments, the user's resources 14 or 15 can be encrypted according to a predetermined encryption key. In some embodiments the encryption key can include the authorization token or a variation of the authorization token. Similarly, the user's resources 14 or 15 can be encrypted using one or more of the authorization parameters stored in the authorization parameter data store 423. The authorization client 420 can then decode or decrypt the received user's resources 15 and provide the requested user's resources to the applications 317. In some embodiments, the user's resources and application data 16 can to be displayed by one or more applications 317 in user interface 316 via the end-user browser 305.

The underlying open-source or proprietary authorization protocol, and all possible variants thereof, can include time-limited or expiring authorization tokens to further increase security in the communications between the business system 315 and the external service providers 340 over potentially unsecured network 330. However, there may also be times when the user may wish to revoke the access grant to his or her resources. For example, the user may decide that data he or she owns in a particular external service provider 340 is no longer required or is not particularly helpful for their intended purposes or activities within the business system 315. In such scenarios, the system and data flow 300 illustrated in FIG. 3 can be used to revoke the applications' 317 access to the user's resources from one or more service providers 340.

Figure 3:
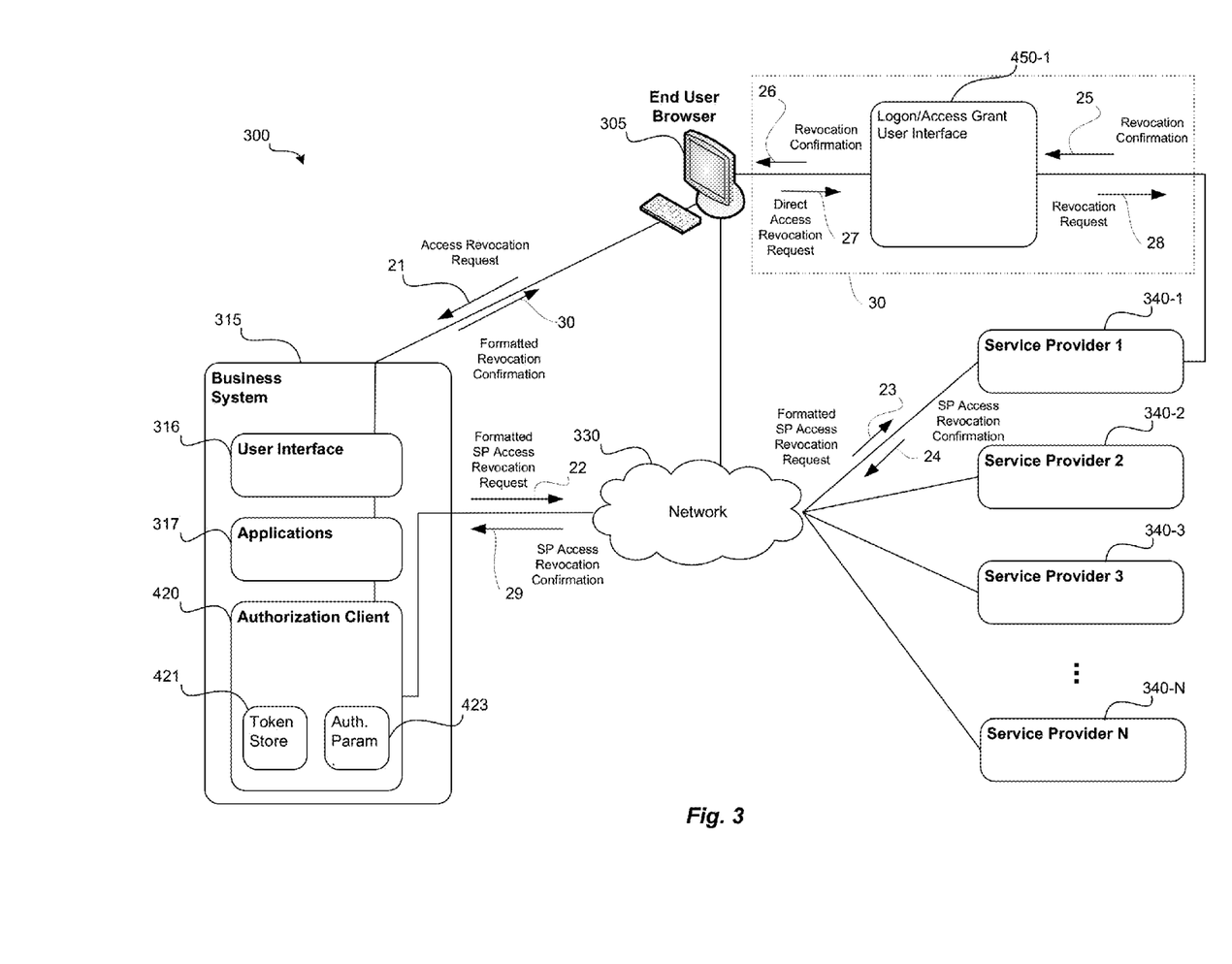
FIG. 3 illustrates a system and data flow for revoking access to resources from external service providers from within a secure system, according to various embodiments of the present disclosure.

In some embodiments, a user can use controls provided by user interface 316 to send a user and service provider specific access revocation request 21 to the business system 315. The access revocation requests 21 can be forwarded to the authorization client 420. In response to the access revocation request 21, the authorization client 420 can delete the corresponding authorization token and authorization parameters from the secure token store 421 and authorization parameter data store 423. In other embodiments, the authorization client 420 can send a formatted access revocation request 22 based on the requirements of the corresponding authorization parameters. In the particular example shown, the formatted access revocation request 22 can be forwarded through network 330 as a formatted access revocation request 23 to the service provider 340-1.

In some embodiments, the external service provider 340-1, in response to the access revocation request 23 can revoke access to the user's resources, cancel all or some of the outstanding authorization tokens, or send an access revocation confirmation message 24 through network 330 as access revocation confirmation message 29 to the authorization client 420. Authorization client 420 can send an update to applications 317 to reset or re-render controls for accessing the user's resources in user interface 316. For example, the previously enabled controls for viewing user's resources associated with the user can be "grayed-out."

In some embodiments, service provider 340-1, or any of the other service providers 340, can require that the user who requested revocation navigate to a separate logon/access grant user interface 450-1 to confirm the revocation in a access revocation confirmation session 30. In such embodiments, service provider 340-1 can send a revocation confirmation message 25 to the user via logon/access grant user interface 450-1. The revocation confirmation message 25 can cause the logon/access grant user interface 450-1 to display a revocation confirmation message 26 to the user in an end-user browser 305. Revocation confirmation message 26 can include a button or other controls that the user can operate to confirm the revocation request.

In one example embodiment, a user can directly access the login/access grant user interface 450-1, without having to log on to the business system 315. In such embodiments, a user can send a direct access revocation request 27 to the login/access grant user interface 450-1 to initiate revocation request message 28 to the service provider 340-1. The service provider 340-1 can then revoke the access previously granted to the applications 317 of business system 315 to access the user's resources. Accordingly, any subsequent request for the user's resources, with or without a previously valid authorization token, can be denied. The denial can be permanent, such that the subsequent attempts to grant access to the user's resources originating with the authorization client 420 can be locked out and/or permanently denied.

While all the above examples described in reference to FIGS. 1 through 3 use a single user example, embodiments of the present disclosure can also include providing access to user resources associated with each of multiple users of business system 315. In such embodiments, the authorization client 420 can store multiple authorization tokens and multiple authorization parameters for multiple users for any and all of the external service providers 340.

Figure 4:
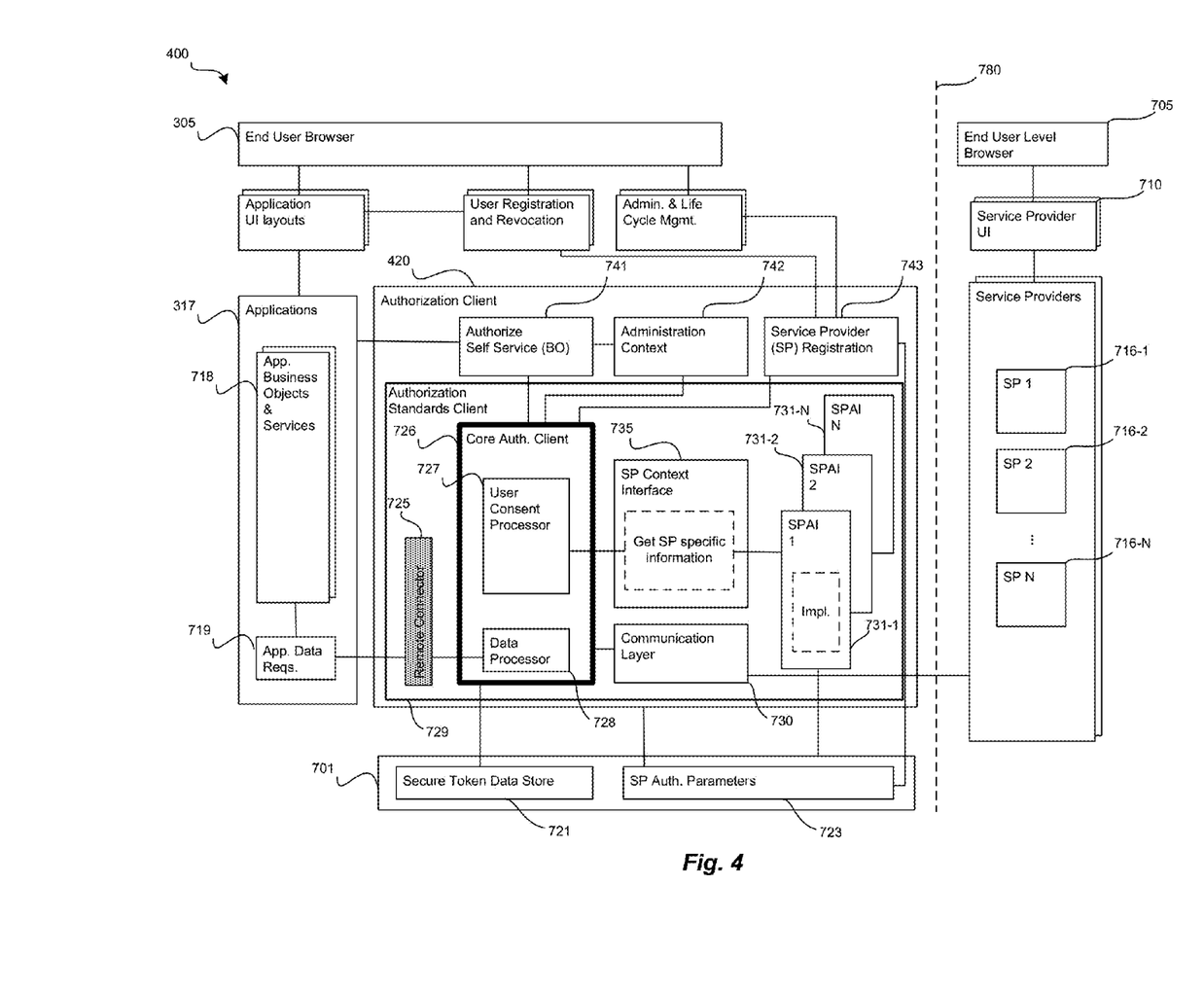
FIG. 4 illustrates a system for implementing an authorization client in a secure system for accessing resources from external service providers, according to various embodiments of the present disclosure.

FIG. 4 is a schematic diagram of a system 400 according to a particular embodiment of the present disclosure. System 400 can include the end-user browser 305 coupled to various applications 317. The end-user browser 305 can be executed on a client computer connected to the business system 315 using a secure communication session. Applications 317 can include various individual application business objects and services 718. Each of the individual application/business objects and services 718 can be coupled to an application data requester (App. Data Reqs.) 719.

The application data requester 719 can handle all calls for external data to the authorization client 420. As depicted in FIG. 4, authorization client 420 can include a number of constituent subcomponents or functions. For example, authorization client 420 can include an authorized self-service subcomponent (BO) 741, an administration context subcomponent 742, and a service provider (SP) registration subcomponent 743. Each of these subcomponents can be coupled to and communicate with authorization standards client 729.

Authorization standards client 729, as shown, can include a number of subcomponents. For example, the authorization standards client 729 can include a remote connector 725 through which all communication from applications 317 can be received. The remote connector 725 can forward communication messages from applications 317 to the data processor 728 within the core authorization client (Core Auth. Client Implementation) 726. In some embodiments, the remote connector 725 is exposed to the applications 317 as an application programming interface (API) that only requires the name of the relevant external service provider and a user identifier associated for the user's resources to which the system 400 is seeking access. Accordingly, the moving the user's resource authorization and access functionality into the authorization client 420 and out of the applications 317 can reduce or eliminate the need for each individual developer of each individual application 317 to determine and code instructions for accessing user's resources.

In one embodiment, the core authorization client 726 is a secure subcomponent that can directly accesses secure token data store 721 in data store 701. In some embodiments, only the core authorization client 726 can access the secure token data store 721 to prevent exposing the sensitive authorization tokens stored therein. In such embodiments, when the data processor 728 receives an access request from one or more applications 317 to access user resources from an external service provider 716, the data processor 728 can parse out information from the access request identifying information for a particular external service providers 716 and the requesting user. In response to the identifying information for the particular service provider 716 and the requesting user, the core authorization client 726 can directly access secure token data store 721 to determine if a previously stored authorization token for that particular pair has been previously stored. If a matching authorization token exists in the secure token data store 720, the core authorization client 726 can retrieve the token. The core authorization client 726 can then generate a formatted resource access message that includes the retrieved authorization token according to corresponding service provider authorization parameters 723.

In some embodiments, the data processor 728 or the communication layer component 730 can generate a formatted resource access message. In one example embodiment, the communication layer component 730 can send the formatted resource access message to the target service providers 716.

As shown, the service providers 716 can exist in a network external to the secure that includes the authorization client 420. For example, all the components to the left of dividing line 780 can be included in the secure system, while all of the service providers 716, the end-user browser 705, and the service provider user interface (UI) 710, located to the right side of dividing line 780, can be located in networks external to the secure system. In some embodiments, dividing line 780 can represent a firewall or an intermediate electronic communication medium, such as the Internet. In some embodiments, the communication layer component 730 can communicate with applications 716 using one or more secure communication protocols, such as the secure hypertext transfer protocol (HTTPS).

In some embodiments, in response to a resource access request from application 713, the core authorization client 726 can determine that no previously stored authorization token exists in the secure token data store 721 or that the relevant authorization token has expired. In such scenarios, the core authorization client 726 can use the user consent processor 727 to process a new user resource access authorization. In such embodiments, the user consent processor 727 can, in response to an identified user and an identified target service provider 716, send a control message to the service provider context interface 735. The service provider context interface 735 can identify the particular service provider 716 and access one or more corresponding service provider authorization implementation (SPAI) records 731. Each of the SPAI records 731 can include information regarding the specific variant of the authorization protocol used by the corresponding service provider 716. For example, service provider 1 shown at 716-1 might use one variant of the open standard OAuth v2 authorization protocol, while the service provider 2 shown at 716-2 uses another variant of OAuth v2. Accordingly, the SPAI record 1 shown at 731-1 would include information regarding the specifics of the variant of the OAuth V2 authorization protocol used by service provider 716-1. Similarly, the SPAI record 2 shown at 731-2 would include information regarding the different variant of the OAuth version 2 authorization protocol used by service provider 2 shown at 716-2. Each of the SPAI records 731 can access secure data store 701 to retrieve relevant service provider authorization parameters.

Service provider context interface 735 then loads in one or more of the SPAI records 731 to include all of the relevant message structure or file format requirements into the user consent processor 727. User consent processor 726 then generates a formatted user resource access message that can be sent to one or more service providers 716 by the communication layer component 730 over one or more external network communication media and protocols.

Figure 5:
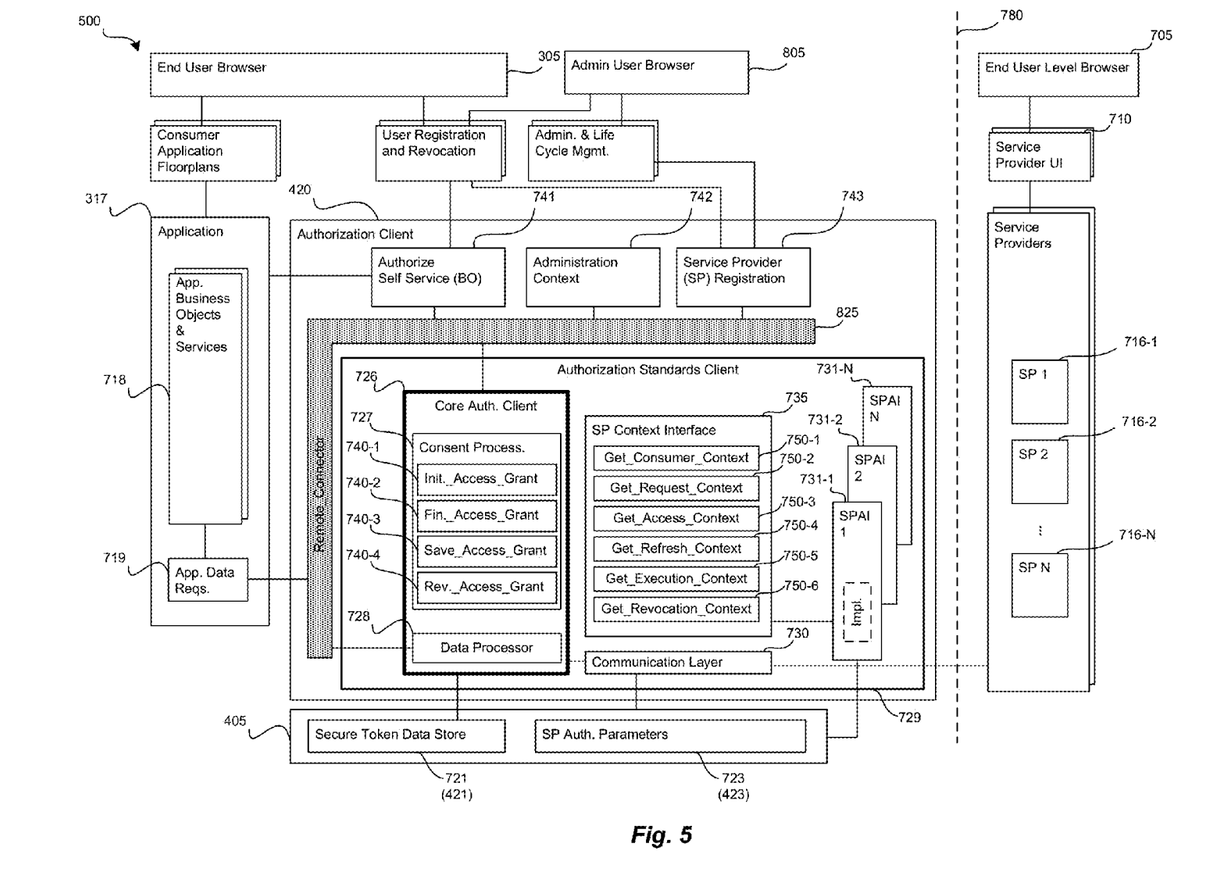
FIG. 5 illustrates another system for implementing an authorization client in a secure system for accessing resources from external service providers, according to various embodiments of the present disclosure.

FIG. 5 illustrates a system 500 as a variation of system 400 of FIG. 4. In such embodiments, all communication with the authorization standards client 729 goes through an remote connector 825. In such embodiments, the authorization standards client 729 can present to any other component in the secure system as an API because of the abstraction layer functionality of the remote connector 825. In addition, the authorization standards client 729 is depicted with additional detail and functionality, according to various embodiments of the present disclosure. For example, core authorization client 726 includes a consent processor 727 that includes various functions 740. Such functions 740 can include an initiate access grant function (Int._Access_Grant) 740-1, a find access grant function (Fin._Access_Grant) 740-2, a save access grant function (Save_Access_Grant) 741-3, and the revoke access grant function (Rev._Access_Grant) 740-4. Any single function 740 or combination of the functions 740 can be used to initiate, find, save, or revoke an access granted to a user resources associated with a particular user.

Similarly, the service provider context interface 735 also includes a number of functions 750. Such functions can include various "get" functions 750 for retrieving consumer context (Get_consumer_Context) 750-1, request context (Get_Request_Context) 750-2, access context (Get_access_Context) 750-3, refresh context (Get_refresh_Context) 750-4, execution context (Get_execution_Context) 750-5, or revocation context (Get_revocation_Context) 750-6. Each of the get functions 750 can retrieve context information from one or more of the external SPAI records 731 and send it to the core authorization client 726. The core authorization can user the context information to generate an appropriately formatted access request message that can be forwarded on to a corresponding service provider 716.

Figure 6:
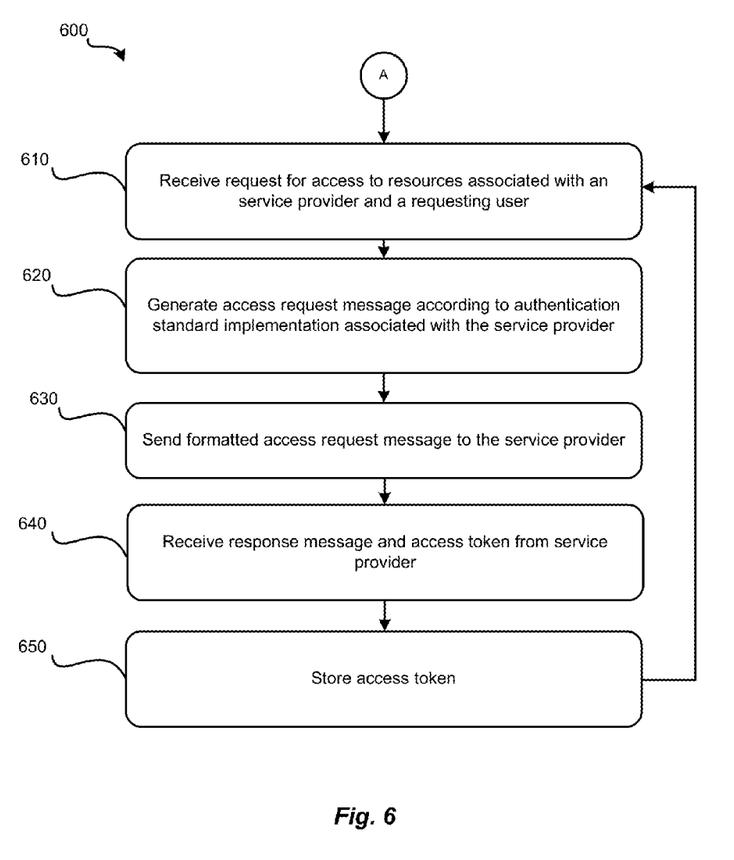
FIG. 6 is a flowchart of a method for authorizing access to resources associated with a user in an external service provider, according to various embodiments of the present disclosure.

FIG. 6 is a flowchart of a method 600 obtaining access to user resources provided by a service provider, according to various embodiments of the present disclosure. In such embodiments, the service providers can be internal or external to the secure system. Method 600 can begin at action 610 in which an authorization client hosted on one or more server computers within a secure system can receive a request for access to resources associated with a requesting user from a particular service provider. Such resources can include files, documents, images, databases, social network media, social network news feeds, business planning resources, social planning resources, and any other information or data available from one or more service providers external to the secure system in which the authorization client is hosted.

In action 620, the authorization client can generate an appropriately formatted request message according to an authorization implementation record associated with the service provider identified in the received request. In some embodiments, the authorization implementation record associated with the service provider can include a variation of an open standard or proprietary authorization protocol. For example, the authorization implementation record can include a variant of the OAuth v2 authorization protocol. Accordingly, the authorization implementation record associated can be available to the authorization client as a model definition of the particular variant of the authorization protocol used the service provider. Generating the request message according to the authorization implementation record associated with the service provider can include referencing the model definition. The authorization client can then send the formatted access request message to the service provider, in action 630. Sending the formatted access request message can include encrypting the formatted access request message according to the model definition and sending the formatted access request message over one or more electronic communication media using one or more electronic communication protocols. In other embodiments, the access request message can be encrypted using various open standard and proprietary encryption techniques.

In response to the formatted access request message, the authorization client can receive a response message from the service provider, in action 640. The response message can indicate whether access was granted. If the authorization is granted, then the authorization client can also receive an authorization token from the service provider. In action 650, the authorization client can store the authorization token in a secure data store for future reference when accessing the user's resources from service provider. Actions 610 through 650 can be repeated for as many as all of the users of a particular secure system. Each authorization token can be specific and unique to each user-service provider pair.

Figure 7:
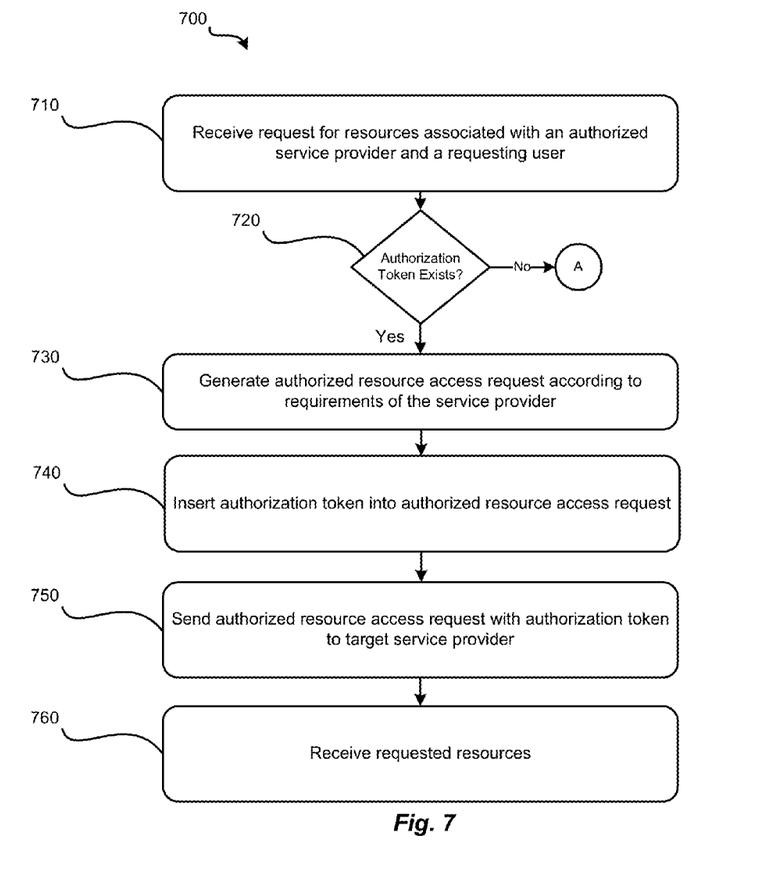
FIG. 7 is a flowchart of a method for accessing resources associated with a user in an external service provider, according to various embodiments of the present disclosure.

FIG. 7 is a method 700 for accessing user resources provided by a service provider from within an application executed in a secure system. In such embodiments, the service providers can be internal or external to the secure system. In action 710, the authorization client can receive a request for user resources, such as documents or business planning group newsfeeds, from one or more applications coupled to the authorization client and executed in the secure system environment. For example one of the applications in the secure system environment can, in response to user input, request that documents available in Google Docs™ be displayed alongside other options for documents available to the secure system or application and be made available for attachment in a particular message or email.

In determination 720, the authorization client can determine whether an access or authorization token exists for that particular requesting user and target service provider. If no corresponding authorization token exists, then the authorization client can execute method 600 to establish authorized access to the user resources in the identified service provider.

If the corresponding authorization token does exist, the authorization client can generate an authorized resource access request by referencing an authorization implementation record, model definition, or associated authorization parameters associated with the target service provider, in action 730. Generating the appropriate authorized resource access request can include generating a message having various delimiters, formats, headers, parameters, and content specific to the authorization protocols implemented by the service provider.

In action 740, authorization client can incorporate the authorization token into the access request. In some embodiments, incorporating the authorization token into the access request can include encrypting the access request using the authorization token. The authorization client can then send the encrypted or unencrypted access request to the target service provider via one or more electronic communication media using one or more electronic communication protocols, in action 750. In response to the access request, the authorization client can receive the requested user resources and forward them on to the requesting application, in action 760.

Figure 8:
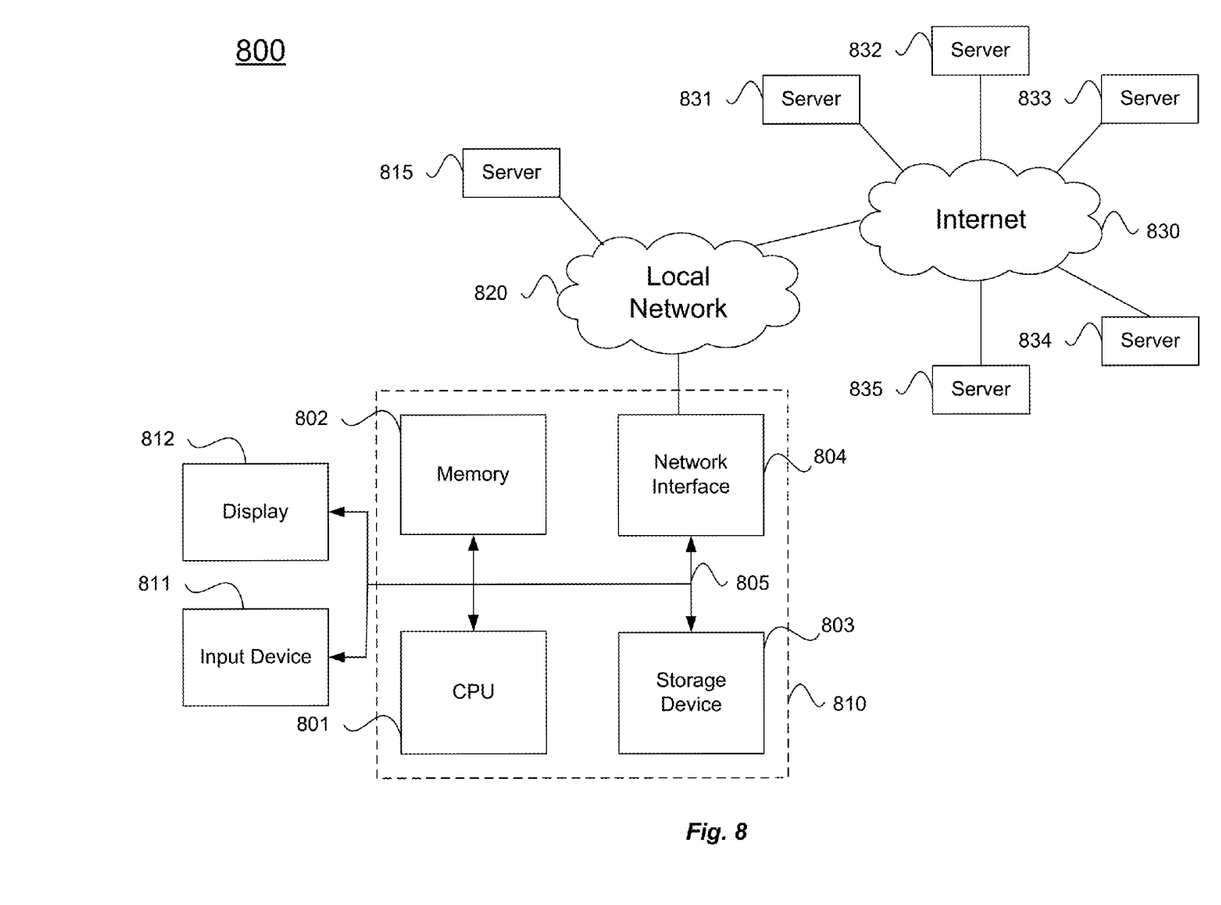
FIG. 8 illustrates an example computer system and networks that may be used to implement various embodiments of the present disclosure.

FIG. 8 illustrates an example computer system and networks that may be used to implement one embodiment of the present invention. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including instructions for performing the techniques described above. This memory may also be used for storing temporary variables or other intermediate information during execution of instructions to be executed by processor 801. Possible implementations of this memory may be, but are not limited to, random access memory (RAM), read only memory (ROM), or both. A storage device 803 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 810 may be coupled via the same or different information bus, such as bus 805, to a display 812, such as a cathode ray tube (CRT) or liquid crystal display (LCD), for displaying information. An input device 811 such as a keyboard and/or mouse is coupled to a bus for communicating information and command selections from the user to processor 801. The combination of these components allows the user to communicate with the system.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 804 sends and receives electrical, electromagnetic, or optical signals that carry digital data streams representing various types of information.

Computer system 810 can send and receive information, including messages or other interface actions, through the network interface 804 to an Intranet or the Internet 830. In the Internet example, software components or services may reside on multiple different computer systems 810 or servers 831 across the network. Software components described above may be implemented on one or more servers. A server 831 may transmit messages from one component, through Internet 830, local network 820, and network interface 804 to a component or container on computer system 810, for example. Software components of a composite application may be implemented on the same system as other components, or on a different machine than other software components. This process of sending and receiving information between software components or one or more containers may be applied to communication between computer system 810 and any of the servers 831 to 835 in either direction. It may also be applied to communication between any two servers 831 to 835.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method comprising:
providing, in a computer system, an authorization client comprising a plurality of authorization implementation records, wherein each of the plurality of authorization implementation records corresponds to a particular implementation of an authorization protocol associated with at least one of a plurality of external service providers;
receiving, in the computer system, a data request message, from one or more applications coupled to the authorization client, for data associated with a user and a first external service provider in the plurality of external services providers, wherein the data associated with the user and the first external service provider is hosted on a remote computer system operated by the first external service provider;
retrieving, in the computer system, an authorization token associated with the first external service provider and the user from a secure data store using the authorization client;
referencing, in the computer system, a first authorization implementation record in the plurality of authorization implementation records associated with the first external service provider to create a formatted data request based on the data request message, wherein the formatted data request comprises the authorization token; and
sending, in the computer system, the formatted data request to the external service provider through the authorization client.

2. The method of claim 1 wherein the formatted data request comprises an encrypted version of the authorization token according to the first authorization implementation record.

3. The method of claim 1 wherein the authorization token is accessible only through the authorization client.

4. The method of claim 1 further comprising receiving, in the computer system, in response to the formatted data request, the data associated with the user and the first external service provider.

5. The method of claim 4 further comprising providing, in the computer system, the data associated with the user and the first external service provider to the one or more applications, wherein the one or more applications display the data associated with the user and the first external service provider in an application specific user interface.

6. The method of claim 5 wherein the first authorization implementation record comprises parameters for decoding the data associated with the user and the first external service provider from a first format to a second format.

7. The method of claim 1 wherein the first authorization implementation record comprises an open standard authorization protocol.

8. A non-transitory computer-readable storage medium containing instructions that, when executed, control a computer processor to be configured for:
providing an authorization client comprising a plurality of authorization implementation records, wherein each of the plurality of authorization implementation records corresponds to a particular implementation of an authorization protocol associated with at least one of a plurality of external service providers;
receiving a data request message, from one or more applications coupled to the authorization client, for data associated with a user and a first external service provider in the plurality of external services providers, wherein the data associated with the user and the first external service provider is hosted on a remote computer system operated by the first external service provider;
retrieving an authorization token associated with the first external service provider and the user from a secure data store using the authorization client;
referencing a first authorization implementation record in the plurality of authorization implementation records associated with the first external service provider to create a formatted data request based on the data request message, wherein the formatted data request comprises the authorization token; and
sending the formatted data request to the external service provider through the authorization client.

9. The non-transitory computer-readable storage medium of claim 8 wherein the formatted data request comprises an encrypted version of the authorization token according to the first authorization implementation record.

10. The non-transitory computer-readable storage medium of claim 8 wherein the authorization token is accessible only through the authorization client.

11. The non-transitory computer-readable storage medium of claim 8 further containing instructions that, when executed, control the computer processor to be configured for receiving, in response to the formatted data request, the data associated with the user and the first external service provider.

12. The non-transitory computer-readable storage medium of claim 11 further containing instructions that, when executed, control the computer processor to be configured for providing the data associated with the user and the first external service provider to the one or more applications, wherein the one or more applications display the data associated with the user and the first external service provider in an application specific user interface.

13. The non-transitory computer-readable storage medium of claim 12 wherein the first authorization implementation record comprises parameters for decoding the data associated with the user and the first external service provider from a first format to a second format.

14. The non-transitory computer-readable storage medium of claim 8 wherein the first authorization implementation record comprises an open standard authorization protocol.

15. A system comprising:
one or more computer processors; and
a non-transitory computer-readable storage medium containing instructions, that when executed, control the one or more computer processors to be configured for:
providing an authorization client comprising a plurality of authorization implementation records, wherein each of the plurality of authorization implementation records corresponds to a particular implementation of an authorization protocol associated with at least one of a plurality of external service providers;
receiving a data request message, from one or more applications coupled to the authorization client, for data associated with a user and a first external service provider in the plurality of external services providers, wherein the data associated with the user and the first external service provider is hosted on a remote computer system operated by the first external service provider;
retrieving an authorization token associated with the first external service provider and the user from a secure data store using the authorization client;
referencing a first authorization implementation record in the plurality of authorization implementation records associated with the first external service provider to create a formatted data request based on the data request message, wherein the formatted data request comprises the authorization token; and
sending the formatted data request to the external service provider through the authorization client.

16. The system of claim 15 wherein the formatted data request comprises an encrypted version of the authorization token according to the first authorization implementation record.

17. The system of claim 15 wherein the authorization token is accessible only through the authorization client.

18. The system of claim 15 further comprising receiving in response to the formatted data request, the data associated with the user and the first external service provider.

19. The system of claim 18 wherein the non-transitory computer-readable storage medium further contains instructions, that when executed, control the one or more computer processors to be configured for providing the data associated with the user and the first external service provider to the one or more applications, wherein the one or more applications display the data associated with the user and the first external service provider in an application specific user interface.

20. The system of claim 19 wherein the first authorization implementation record comprises parameters for decoding the data associated with the user and the first external service provider from a first format to a second format.

* * * * *